(12) United States Patent
King et al.

(10) Patent No.: US 8,426,783 B2
(45) Date of Patent: Apr. 23, 2013

(54) MICROWAVE ASSISTED CHEMICAL SYNTHESIS INSTRUMENT WITH CONTROLLED PRESSURE RELEASE

(75) Inventors: Edward Earl King, Bellbrook, OH (US); James Edward Thomas, Harrisburg, NC (US)

(73) Assignee: CEM Corporation, Matthews, NC (US)

( * ) Notice: Subject to any disclaimer, the term of this patent is extended or adjusted under 35 U.S.C. 154(b) by 0 days.

(21) Appl. No.: 12/901,026

(22) Filed: Oct. 8, 2010

(65) Prior Publication Data

US 2011/0042372 A1 Feb. 24, 2011
US 2012/0043313 A9 Feb. 23, 2012

Related U.S. Application Data

(62) Division of application No. 11/852,494, filed on Sep. 10, 2007, now Pat. No. 7,829,828, which is a division of application No. 10/126,838, filed on Apr. 19, 2002, now Pat. No. 7,282,184.

(51) Int. Cl.
*H05B 6/72* (2006.01)
*H05B 6/74* (2006.01)
*G01N 7/16* (2006.01)

(52) U.S. Cl.
USPC ............ 219/679; 219/678; 436/155; 422/130

(58) Field of Classification Search .................. 219/679, 219/697, 687, 696, 678, 728, 729, 745, 762, 219/756, 736; 436/155, 157, 183, 148, 175; 422/102, 112, 117, 119, 186, 82.13; 333/248, 333/227, 212
See application file for complete search history.

(56) References Cited

U.S. PATENT DOCUMENTS

| | | | |
|---|---|---|---|
| 4,681,740 | A | 7/1987 | Commarmot et al. |
| 4,736,083 | A | 4/1988 | Saville |
| 4,882,128 | A | 11/1989 | Hukvari et al. |
| 4,904,450 | A | 2/1990 | Floyd |
| 5,108,701 | A | 4/1992 | Zakaria et al. |
| 5,204,065 | A | 4/1993 | Floyd |
| 5,230,865 | A | 7/1993 | Hargett et al. |
| 5,246,674 | A | 9/1993 | Katschnig et al. |
| 5,264,185 | A | 11/1993 | Floyd |
| 5,308,944 | A | 5/1994 | Stone-Elander et al. |
| 5,369,034 | A | 11/1994 | Hargett et al. |

(Continued)

FOREIGN PATENT DOCUMENTS

| | | |
|---|---|---|
| EP | 0 416 759 | 5/1994 |
| EP | 0628330 A1 | 12/1994 |

(Continued)

*Primary Examiner* — Quang Van
(74) *Attorney, Agent, or Firm* — Summa, Additon & Ashe, P.A.

(57) ABSTRACT

An instrument for carrying out controlled microwave assisted chemical processes is particularly useful for handling relatively small samples. The instrument includes a needle, and a needle seal adjacent the needle and having a shaft coaxial with the needle and in communication with the needle. A pressure transducer is opposite the needle seal from the needle and in communication with the shaft. A housing holds the needle to the needle seal and the needle seal to the transducer. A chamber is formed between the housing and the needle seal. A lateral shaft goes through the needle seal from the coaxial shaft to the chamber in the housing, and a valve is in communication with the chamber.

5 Claims, 10 Drawing Sheets

U.S. PATENT DOCUMENTS

| | | |
|---|---|---|
| 5,407,641 A | 4/1995 | Katschnig et al. |
| 5,659,874 A | 8/1997 | Rault et al. |
| 5,672,316 A | 9/1997 | Knapp |
| 5,725,835 A | 3/1998 | Lautenschlager |
| 5,796,080 A | 8/1998 | Jennings et al. |
| 5,932,075 A | 8/1999 | Strauss et al. |
| 6,011,247 A | 1/2000 | Grillo et al. |
| 6,084,226 A | 7/2000 | Greene et al. |
| 6,086,826 A | 7/2000 | Thomas et al. |
| 6,147,336 A | 11/2000 | Ushijima et al. |
| 6,149,872 A | 11/2000 | Mack et al. |
| 6,227,041 B1 | 5/2001 | Collins et al. |
| 6,258,329 B1 | 7/2001 | Mutterer, Jr. et al. |
| 6,268,570 B1 | 7/2001 | McLendon et al. |
| 6,288,379 B1 | 9/2001 | Greene et al. |
| 6,302,577 B1 | 10/2001 | Jennings et al. |
| 6,320,170 B1 | 11/2001 | Jennings et al. |
| 6,561,012 B1 | 5/2003 | Sadler |
| 6,607,920 B2 | 8/2003 | Jennings et al. |
| 6,753,517 B2 | 6/2004 | Jennings |
| 6,886,408 B2 | 5/2005 | Jennings et al. |
| 6,966,226 B2 | 11/2005 | Jennings et al. |
| 7,144,739 B2 | 12/2006 | Jennings |
| 7,208,709 B2 | 4/2007 | Jennings et al. |
| 7,282,184 B2 | 10/2007 | King et al. |
| 7,820,951 B2 | 10/2010 | King et al. |
| 7,829,828 B2 | 11/2010 | King et al. |
| 2002/0101310 A1 | 8/2002 | Jennings |
| 2002/0102738 A1* | 8/2002 | Jennings et al. ............ 436/155 |
| 2008/0053987 A1 | 3/2008 | King et al. |
| 2008/0061056 A1 | 3/2008 | King et al. |

FOREIGN PATENT DOCUMENTS

| | | |
|---|---|---|
| JP | 02-074861 | 3/1990 |
| JP | 03-256870 | 11/1991 |
| JP | 07-325000 | 12/1995 |
| JP | 09-510907 | 11/1997 |
| JP | 10-096714 | 4/1998 |
| JP | 10-182501 | 7/1998 |
| JP | 2000-48944 | 2/2000 |
| WO | 99/13979 | 3/1999 |
| WO | 97/13136 A1 | 4/1999 |
| WO | 03/039738 | 5/2003 |

* cited by examiner

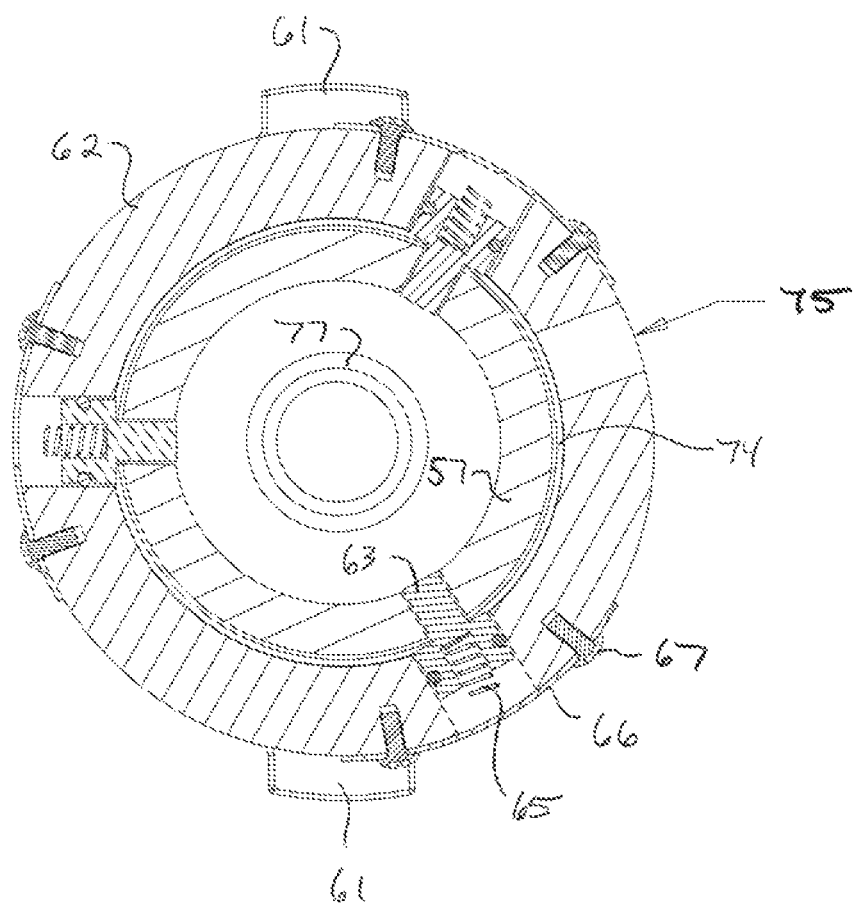

MICROWAVE ASSISTED CHEMICAL SYNTHESIS INSTRUMENT WITH CONTROLLED PRESSURE RELEASE

RELATED APPLICATIONS

This application is a divisional application of Ser. No. 11/852,494 filed Sep. 10, 2007 and now U.S. Pat. No. 7,829,828. Ser. No. 11/852,494 is a divisional of Ser. No. 10/126,838 filed Apr. 19, 2002 and now U.S. Pat. No. 7,282,184. This application is also related to copending and commonly-assigned application Ser. No. 11/852,480 filed Sep. 7, 2007 and now U.S. Pat. No. 7,820,951. This application is also related to commonly-assigned application Ser. No. 09/773,846 filed Jan. 31, 2001, and now U.S. Pat. No. 6,753,517, the contents of which are incorporated entirely herein by reference ("the '846 application").

BACKGROUND

The present invention relates to the use of microwave assisted techniques to carry out chemical reactions, particularly sophisticated chemical synthesis reactions. More specifically, the invention relates to an apparatus and method for controlled pressure release during such synthesis in a microwave-assisted instrument.

As set forth in the '846 application, interest has grown in the use of microwave assisted techniques for chemical synthesis, particularly organic synthesis using relatively small amounts of reagents. The term "small" is used herein in a relative sense, but those familiar with modern experimental synthesis techniques such as the development of pharmaceuticals recognize that sample sizes of 5 milliliters (ml) or less are quite common, particularly when numerous sample reactions are being studied. In recent years, the availability and lowered cost of computer processing power and memory has given rise in the areas of chemical synthesis and analysis to automated and semi-automated techniques that carry out such chemical processes in relatively rapid fashion on large numbers of such small samples, and that quickly provide useful information based on the completed processes. Thus, the potential to include microwave assistance as a part of such processes offers another method of increasing the speed with which they can be carried out, and thus correspondingly increase the number of processes that can be carried out within any given time frame.

The use of small amounts raises different problems than have traditionally been raised in other areas of microwave-assisted chemistry such as digestion and loss-on-drying moisture content determinations. Such prior (and still extremely useful) microwave assisted techniques and instruments have now been joined by this newer generation of sophisticated microwave assisted instruments that can focus microwave energy on very small samples in a manner that heats the samples in a desired and controlled manner without overheating them or driving the reagents to decomposition. By way of comparison, complete or near-complete decomposition is the goal of digestion, and thus excessive (relatively speaking) temperatures generally represent less of a process problem. Chemical synthesis, however, has the goal of encouraging particular reactants to act in an expected or predictable manner to produce desired products. Thus, in many synthesis scenarios temperature and pressure (among other factors) must be maintained within appropriate limits.

In addition to the '846 application, other recent advances in microwave assisted chemistry include (but are not limited to) those discussed in U.S. Pat. Nos. 6,320,170; 6,302,577; 6,268,570; 6,227,041; 5,796,080.

The '846 application discloses an instrument that can handle relatively small samples, typically liquid samples of organic materials, and that can apply precise and moderated amounts of microwave energy within its cavity to drive reactions carried out in vessels in the cavity in a manner appropriate to chemical synthesis. In particular, the '846 application discloses a sophisticated structure for measuring the pressure inside of sealed vessels while reactions are proceeding. As known to those familiar with chemical synthesis, particularly in closed conditions, the pressure generated can be a measure of several factors, the primary ones typically being gaseous byproducts from the reaction, or an increase in gas temperature in accordance with the ideal gas laws, or both. Accordingly, pressure measurement is a valuable option in such instruments. In the '846 application, a reaction vessel, one version of which resembles a classic test tube, is sealed in a pressure-resistant manner with a metal cap and a flexible septum. A small needle is positioned to pierce and penetrate the septum, and is in fluid (usually gas) communication with a pressure transducer at the needle's opposite end. Using the instrument, the pressure inside of the vessel can be constantly monitored as a reaction proceeds and as microwave energy is applied.

In the instrument described in the '846 application, however, the only way to release pressure inside the reaction vessel is to remove the cap completely from the vessel (e.g. at the completion of a desired reaction) or alternatively to remove the transducer from the needle. In one case the reaction may be affected or interrupted, while in the other the ability to measure pressure is forfeited.

Furthermore, the instrument described in the '846 application lacks any convenient means for attaching the vessel to a gas source, should that be desired or required in particular circumstance.

Thus, although this is satisfactory in a number of circumstances, and although the instrument described in the '846 application is a significant improvement in microwave-assisted synthesis techniques and instrumentation, and has gained rapid commercial acceptance, the need still exists for an apparatus in which pressure can be controllably released (bled or vented) from a reaction vessel—or a gas added thereto—as the reaction proceeds. Such potential release offers several advantages, such as the ability to keep pressure below a certain threshold, or to drive a reaction towards completion by removing one of the reaction products from the environment in accordance with LeChatelier's principle. In this regard, gases are the products of certain reactions, and absent the capability to release or relieve the associated increase in pressure in a closed environment, the reactions must be avoided in order to avoid pressure-related failure of the vessel.

In another aspect, lack of controlled communication with a closed vessel can prevent the use of additional reagents, such as adding liquids or gases (as solvents or reagents) in order to carry out a later stage of a multi-step reaction.

Pressure-release vessels exist for microwave assisted chemistry, but generally in the context of preventing a pressure generated failure that renders the vessel unusable. For example, in commonly assigned U.S. Pat. Nos. 5,230,865 and 5,369,034 pressure release is provided by a disposable polymeric barrier (e.g. a rupture disk) positioned to block one of the gas passageways between the pressurized interior of the reaction vessel and its lower-pressure (often atmospheric) surroundings. When the pressure inside the vessel exceeds the threshold of the barrier (which should be selected to be less than that of the remainder of the vessel), the barrier fails and the interior pressure is released. Although such pressure release is "controlled" in the sense that it prevents total failure of the vessel, it is uncontrolled in the sense that the pressure cannot be monitored and adjusted as a reaction in the vessel proceeds.

The '034 and '865 patents also include a pressure bleed capability, but not in conjunction with pressure measurement.

Commonly assigned U.S. Pat. No. 6,086,826 shows a different type of pressure measurement in which a pressure transducer is mounted outside of a closed vessel and the movement of the exterior of the vessel against the transducer gives a representative measurement of the pressure inside the vessel. This provides specific advantages when the pressure measurement device is best isolated from the reaction in the vessel, for example under particularly harsh chemical conditions such as digestion. It does not, however, provide the more convenient temperature monitoring and control useful, and sometimes necessary, in synthesis of small samples in more carefully controlled reactions.

Several patents to Floyd, including U.S. Pat. Nos. 4,904,450; 5,204,065 and 5,264,185 also include a rupture-disk type of pressure relief system. The Floyd '185 patent also includes a transducer, but the rupture disk is positioned as a diaphragm between the vessel and the transducer; i.e. there exist no direct fluid communication unless and until the rupture disks breaks under pressure. Thus pressure can only be measured in a secondary fashion, and provided the limits of the ruptured disk are not exceeded.

Lautenschlager U.S. Pat. No. 5,725,835 discloses a device in which a gas (fluid) path extends from a reaction chamber to a series of valves, one of which is electrically controlled, one of which is spring biased, one of which is a simple rupture disk, and one of which operates manually. As set forth in FIG. 2 and the related discussion in the '835 patent, however, such pressure control is carried out between the reaction chamber and the valves rather than between individual vessels and the valves.

Strauss U.S. Pat. No. 5,932,075 illustrates a vessel having a closure or cover that carries a number of control items, including a pressure measurement path, a separate pressure release path independent of the pressure measurement path, a sampling path, and a temperature measurement device, the key feature of which, according to Strauss, is the use of a heat exchanger (24 in several of the Strauss figures) that permits a reaction to be heated or cooled while in progress. The Strauss device and its cover require a fair degree of complexity, however, and is potentially less conducive for repetitive use on larger numbers of small samples.

Furthermore, other than the '846 application, none of these devices provides a practical structure or method for quickly carrying out numerous reactions in sequential fashion. Stated differently, none provide a method or apparatus wherein reagents can be added to a number of vessels following which the vessels can be sealed and placed in a microwave cavity, can have the pressure and temperature therein measured while microwaves are being applied, and can be removed from the cavity, all without opening the vessel or fatally breaching the seal.

Accordingly, the need exists for apparatus and related techniques that can carry out microwave-assisted synthesis on small samples while still providing the opportunity desired for controlled pressure release, including pressure release during ongoing reactions.

SUMMARY

Therefore, it is an object of the invention to provide microwave-assisted synthesis on small samples combined with the opportunity for controlled pressure release, including pressure release during ongoing reactions.

The invention meets this object with an instrument for carrying out controlled microwave assisted chemical processes, and that is particularly useful for handling relatively small samples. In this aspect, the instrument includes a microwave transparent reaction vessel with an open mouth, a pressure resistant seal on the mouth of the vessel, a needle, portions of which penetrate the seal with a first end of the needed providing fluid communication into the vessel, a pressure transducer at the opposite end of the needle and in fluid communication with the interior of the vessel through the needle, a pressure controlled flow path from a portion of the needle outside of the vessel to a fluid port, the flow path being in communication with the needle, the interior of the vessel and the transducer, and a controllable pressure release valve for the flow path and associated with the port.

In another aspect, the invention is an instrument for carrying out controlled microwave assisted chemical processes that includes a microwave cavity, a vessel assembly that includes a microwave transparent vessel, a seat in the cavity for receiving the vessel assembly and positioning at least portions of the vessel in the microwave cavity, locking means for locking the vessel assembly in the seat, and a release mechanism for releasing the vessel assembly from the seat.

In another aspect, the invention is a method of carrying out microwave assisted chemical reactions. In this aspect, the invention comprises adding reagents to a microwave transparent vessel, securing the vessel against pressure release with a seal, thereafter inserting a needle through the seal and into the pressure-secured vessel to provide fluid communication to the interior of the sealed vessel through the needle, and radiating the vessel and its contents with microwaves.

In yet another aspect, the invention is an instrument that includes a vessel assembly that includes a sealed vessel, a pressure module assembly that is removable and engageable with the vessel assembly and that includes means, when engaged, for measuring the pressure inside of the sealed vessel, and an attenuator assembly for removeably receiving the vessel assembly and the pressure assembly in engagement and for positioning portions of the vessel in a microwave cavity and portions of the vessel and vessel assembly outside of the cavity while providing an attenuating barrier to the escape of microwaves from the cavity.

In yet another aspect, the invention is a pressure release structure for a microwave instrument that comprises a needle, a needle seal adjacent to the needle and having a shaft coaxial with the needle and in communication therewith, a pressure transducer opposite the needle seal from the needle and in communication with the shaft, a housing holding the needle to the needle seal and the needle seal to the transducer, a chamber formed between the housing and the needle seal, a lateral shaft through the needle seal from the coaxial shaft to the chamber in the housing, and a valve in communication with the chamber.

In yet another aspect, the invention comprises a microwave attenuator, a lock ring on the attenuator for locking the attenuator to a microwave cavity, an annular housing engageable with the lock ring, a plurality of spring loaded pistons in the housing that are urged inwardly from the inner circumference of the housing toward the center, and means for controllably urging the pistons in a direction outwardly from the inner circumference of the housing.

The foregoing and other objects and advantages of the invention and the manner in which the same are accomplished will become clearer based on the followed detailed description taken in conjunction with the accompanying drawings in which:

BRIEF DESCRIPTION OF THE DRAWINGS

FIG. 8 is a cross sectional view of the attenuator assembly of the present invention.

DETAILED DESCRIPTION

The present invention is an instrument for carrying out controlled microwave assisted chemical processes and that is particularly useful for handling relatively small samples. As set forth in the background portion of the specification, the present invention is a continuing improvement upon the instrument set forth in co-pending application Ser. No. 09/773,846. The '846 application is incorporated entirely herein by reference, and thus additional background to and advantages of the invention are set forth in the '846 application.

Figure 1:
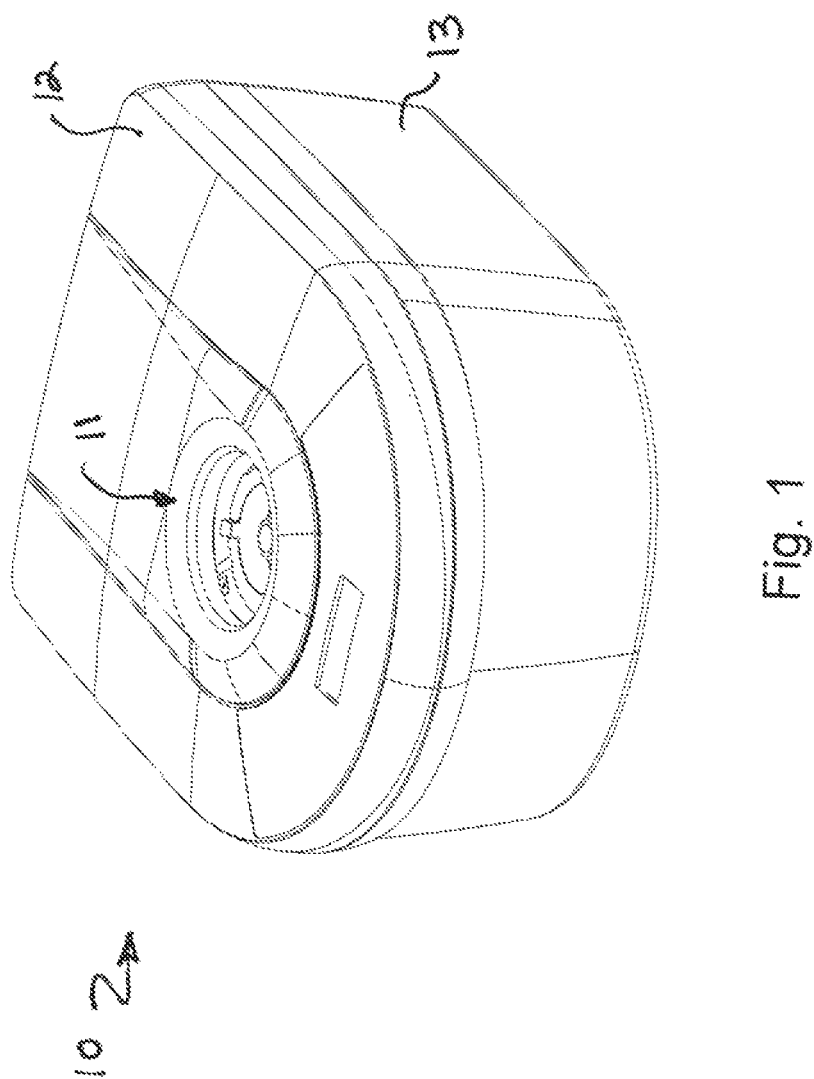
FIG. 1 is a perspective view of a commercial embodiment of the present invention.

FIG. 1 illustrates a commercial embodiment of the invention broadly designated at 10. Although the design set forth in FIG. 1 is exemplary of a current commercial embodiment, it will be understood that the nature of the invention is such that FIG. 1's illustration is merely illustrative of one version, and that the invention is not limited to its appearance in FIG. 1 or variations thereof. For illustrative purposes, however, the position of the microwave cavity in the instrument 10 is broadly designated at 11 in FIG. 1. The cavity itself and its nature and operation are set forth in FIG. 3 herein, and in further detail in the '846 application. FIG. 1 also illustrates that the instrument preferably includes a housing formed of an upper portion 12 and a lower portion 13. Because of the nature of the chemical environment in which the instrument is typically used, the housing portions 12 and 13 are preferably formed of materials that are either resistant to most or many chemicals, or are coated with an appropriate coating that is so resistant. Such materials are generally well understood in this art and can be selected and implemented without undue experimentation.

Figure 2:
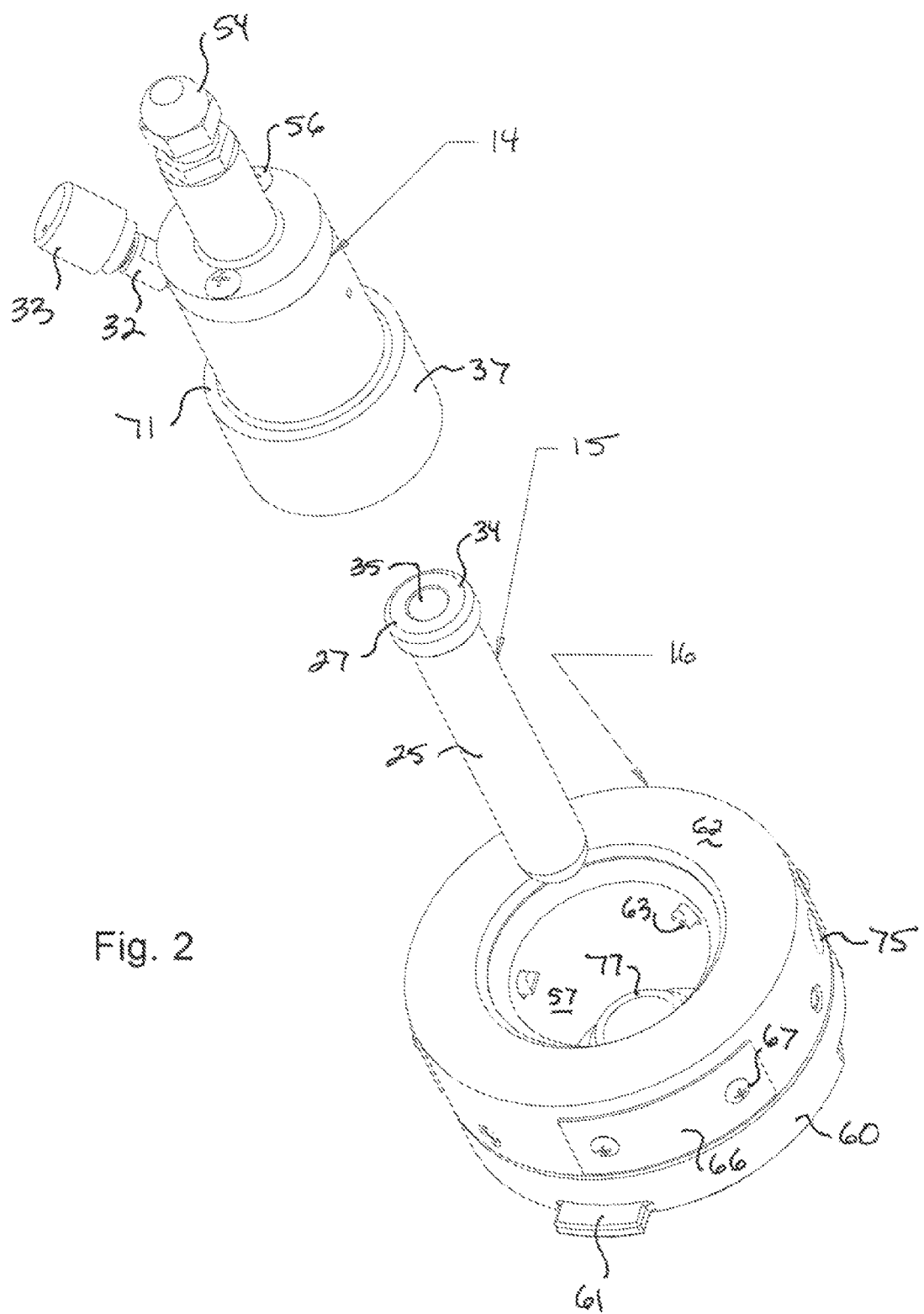
FIG. 2 is a partially disassembled perspective view of the pressure module assembly, the vessel assembly, and the attenuator assembly of the present invention.

FIG. 2 illustrates three of the main components of the present invention in partially-exploded fashion. These include the pressure-module assembly broadly designated at 14, the vessel assembly broadly designated at 15, and the attenuator assembly broadly designated at 16. Most of the details of the pressure-module assembly 14, the vessel assembly 15, and the attenuator assembly 16 will be set forth and described in more detail with respect to other drawings herein. Nevertheless, FIG. 2 provides an appropriate overview of these parts and their general relationship to one another. Thus, FIG. 2 contains a number of reference numerals which are described with respect to other drawings, rather than particularly with respect to FIG. 2. These reference numerals maintain their same meaning throughout the specification and drawings. In general (and referring to further descriptions herein), the vessel assembly 15 includes a sealed vessel (or "vial") 25. The pressure module assembly 14 is removably engageable with the vessel assembly 15 and includes means, when engaged, for measuring the pressure inside of the sealed vessel 25. The attenuator assembly 16 removably receives the vessel assembly 15 and the pressure assembly 14 in engagement and positions portions of the vessel 25 in a microwave cavity and portions of the vessel 25 and vessel assembly 15 outside of the cavity while providing an attenuating barrier to the escape of microwaves from the cavity. In particular, the relationship between the vessel assembly 15 and the attenuator assembly 16 positions the needle 30 in the vessel 25 in a manner that avoids interference between the needle 30 and microwave transmission in the cavity.

Figure 3:
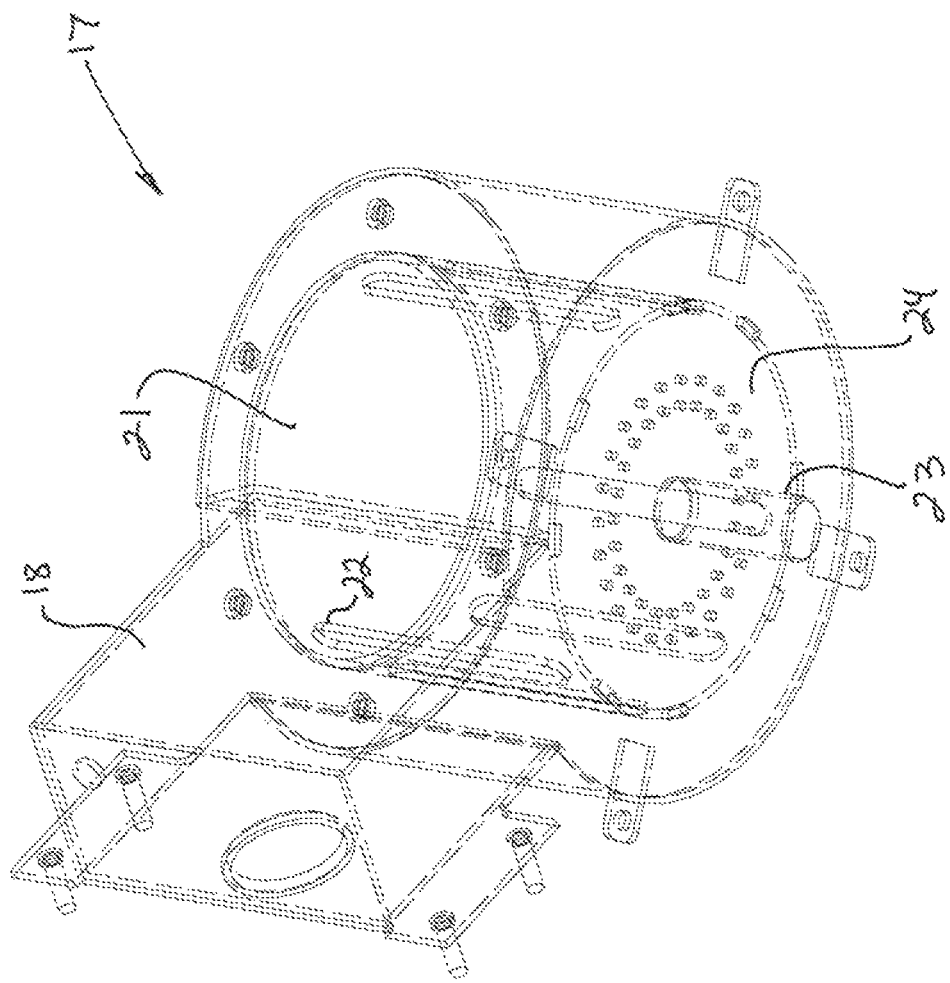
FIG. 3 is a perspective view of a microwave cavity and associated waveguide as used in the present invention.

FIG. 3 illustrates a microwave cavity of the type described in the '846 application and which is used in conjunction with the improvements of the present invention. In FIG. 3 the cavity is broadly designated at 17 and is shown with a partially integrated waveguide portion 18 which receives microwaves initially from a microwave source (not shown) such as a klystron, a magnetron, or potentially a solid state source such as a Gunn diode, and directs them to the cavity. In the preferred embodiments of the '846 application, the cavity 17 has a circular inner circumference 21 that includes a plurality of openings 22 through which microwaves propagate from the waveguide 22 into the cavity 17. As also set forth in the '846 application, the cavity 17 includes a central opening 23 in the floor 24 of the cavity. The opening 23 permits the vessel in the cavity 17 to be monitored, and preferably monitored for temperature using a radiant monitoring device such as an infrared temperature sensor. The remaining details of FIG. 3 are generally mechanical in nature and relate to the basic assembly of the parts using rivets or screws or the like, and will not be discussed in detail herein other than as necessary to describe the invention.

Figure 4:
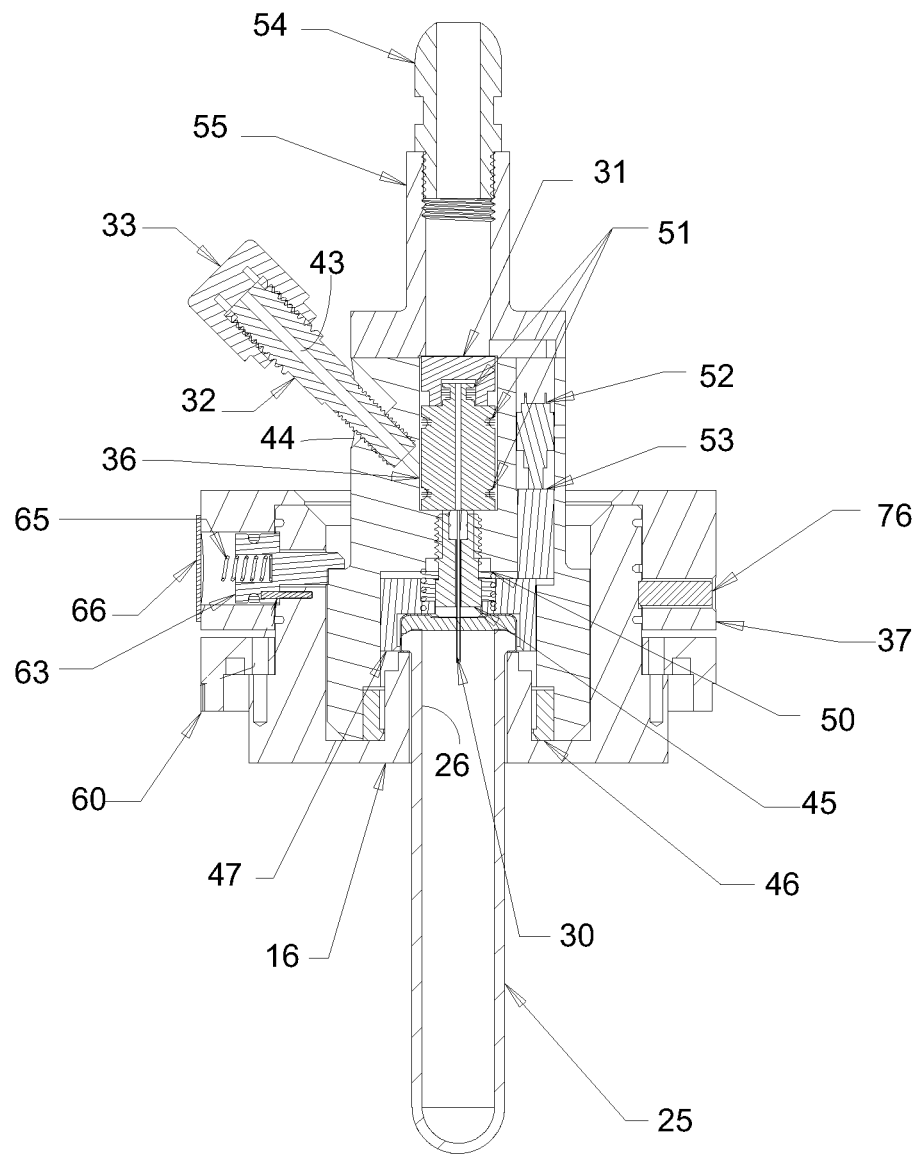
FIG. 4 is a cross sectional view of the attenuator assembly, vessel assembly, and pressure module assembly in their respective operating positions.

FIG. 4 illustrates a number of details and aspects of the invention. The invention includes a microwave transparent reaction vessel 25 with an open mouth 26. A pressure resistant seal 27 (most clearly seen in FIG. 2) is on the mouth 26 of the vessel 25. A needle 30 (which of course is hollow for fluid transmission purposes) has portions that penetrate the seal 27 with a first end of the needle 30 providing fluid (normally gas) communication into and with the vessel 25. The needle 30 is typically, although not necessarily, formed of metal A pressure transducer 31 is positioned at the opposite end of the needle 30 and in fluid communication with the interior of the vessel 25 through the needle 30. Pressure transducers and their operation are well understood in this art and a wide variety are commercially available. Thus, the transducer can be selected without undue experimentation provided it fits into the housing and is calibrated to measure the pressures expected from the vessel 25.

The needle 30 is part of a pressure control flow path (that will also be described in some detail with respect to FIG. 4 and other of the drawings) from a portion of the needle 30 that is outside of the vessel 25 to a fluid port 32 with the flow path being in communication with the needle 30, the interior of the vessel 25, and the pressure transducer 31. A controllable pressure release valve shown as the vent nut 33 is part of the flow path and is associated with the port 32. The vent nut 33 is probably the simplest example of a pressure release valve, and it will be understood that more sophisticated devices can also be incorporated as desired or necessary.

The seal 27 on the vessel 15 preferably includes a penetrable septum 35 (FIG. 2) for permitting the needle 30 to be inserted through the seal 27 so that the vessel 15 can be sealed prior to inserting the needle 30. This offers particular advantages over the prior art in which the vessel seal typically carries an integral pressure release mechanism that prevents a vessel from being filled and sealed in the absence of the pressure measuring device. The septum 35 is preferably formed of butyl rubber or silicone, and has a thickness and composition sufficient to allow the needle to be inserted and removed while the septum 35 re-closes and re-seals behind the needle 30 so that the vessel can remain sealed before the needle is inserted, while the needle is inserted, and after the needle has been removed. Although the number of times that a needle can be inserted and removed from a single septum is not infinite, the ability to do it several times while maintaining a pressure resistant seal offers significant advantages over seals and pressure measurement assemblies that require the vessel to be opened in order to change or remove the pressure measuring device.

As perhaps best illustrated in FIG. 2, the seal 27 preferably forms a cap that includes a metal portion 34 and the septum 35 in concentric relationship to one another. The metal portion 34 of the seal 27 provides for an excellent clamping seal between the seal 27 and the vessel 15 while still permitting the incorporation of the penetrable septum 35.

As in other microwave applications, the microwave transparent material selected for the vessel 15 can be any material that is appropriately transparent to microwave frequencies and which can withstand, based upon its composition, design and structure, the pressures expected to occur in any given reaction. Commonly preferred materials for vessels include glass, quartz, various polymers including engineering polymers, and in some cases combinations of these materials. In many circumstances, the vessel 15 will resemble a glass test tube or glass laboratory flask, which offer certain advantages, but the invention and its use and advantages are not so limited.

Accordingly, the instrument of the present invention provides the process advantage of adding reagents to a reaction vessel, then sealing the vessel and placing it in a microwave cavity, then measuring its temperature and pressure without opening the vessel or fatally breaching its seal, and then removing the vessel from the cavity and from the pressure measuring instrument, all while maintaining the seal intact. Such capability adds the further capability of pre-filling a number of vessels with the desired reagents (or with reagents that differ, slightly or greatly, from vessel to vessel) and then sequentially carrying out microwave assisted chemistry techniques on the contents of the vessel, and again without opening the vessels. The sequential and relatively rapid treatment of a plurality of vessels also has obvious benefits for automated processes, such as those often referred to as "combinatorial" techniques.

Figure 5:
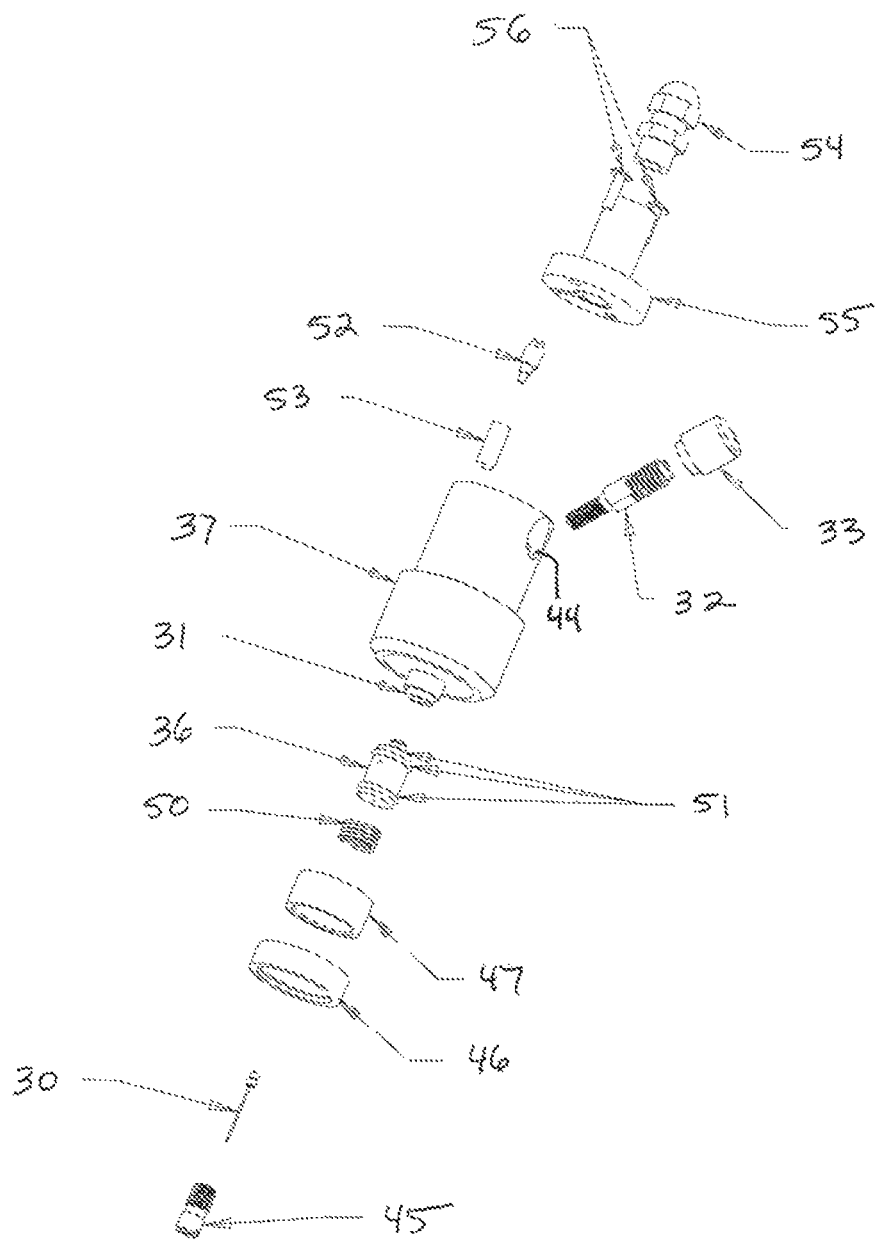
FIG. 5 is an exploded view of the pressure module assembly according to the present invention.
Figure 6:
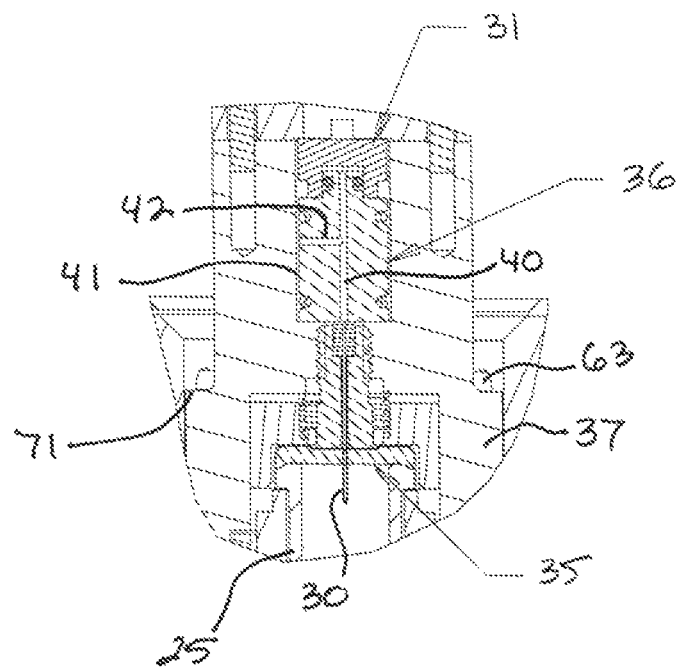
FIG. 6 is an enlarged cross sectional view of a portion of the first embodiment of the pressure module assembly.

The manner in which the invention allows for controlled pressure release is best illustrated by taking the views of FIGS. 4, 5 and 6 in combination. Each of these figures shows that in preferred embodiments a needle seal 36 is positioned between the needle 30 and the pressure transducer 31. These elements are in turn assembled and held together in a housing 37. The needle seal 36 has an internal shaft 40, most clearly illustrated in FIG. 6, that is coaxial with the needle 30 and in communication with the needle 30 to thereby provide direct fluid (gas) communication from the interior of the vessel 15 through to the pressure transducer 31. FIG. 6 also shows that the housing 37 holds the needle 30 to the needle seal 36, and the needle seal 36 to the transducer 31. In particular, FIGS. 4, 5 and 6 illustrate that both the needle seal 36 and the housing 37 are cylindrical, and that the housing 37 surrounds the needle seal 36. The needle seal 36 has an outer diameter that is slightly less than the inner diameter of the housing 37. As a result, the housing 37 and the needle seal 36 form an annular chamber 41 therebetween.

The needle seal 36 also includes a lateral shaft 42 (i.e., one that is not coaxial with the needle 30) through the needle seal 36 from the coaxial shaft 40 to the annular chamber 41.

Returning to FIG. 4, it will be seen that the annular chamber 41 is in communication with the port 32 through the port shaft 43, which in preferred embodiments is threaded into the port opening 44. FIG. 4 shows the lateral shaft 42 as the small circle normal to the drawing in the middle of the coaxial shaft 40 in the needle seal 36. The vent nut 33 serves as a preferred valve embodiment for the port 32. FIGS. 4, 5 and 6 thus illustrate the manner in which pressure can be controllably released from the sealed vessel 15 at any time, including during the application of microwave frequencies to the contents of the vessel 15; i.e. as a desired chemical reaction is proceeding. FIGS. 4, 5 and 6 illustrate the lateral shaft 42 as being perpendicular to the coaxial shaft 40, but it will be understood that this is a preferred embodiment, and that the communication between and among the coaxial shaft 40, the lateral shaft 42 and the annular chamber 41 could be made at different angles or orientations while functioning in entirely the same manner as the illustrated embodiment. Indeed, given the nature and behavior of fluids (particularly gases) even alternative or more contorted pathways could serve this purpose.

FIGS. 4 and 5 illustrate additional mechanical details of the preferred embodiment illustrated therein. The needle 30 is incorporated into the housing 37 using a needle screw 45. A retaining flange 46 and a seal cap 47 are part of the pressure-module assembly 14, and help keep the pressure-module assembly 14 engaged with the attenuator assembly 16 in a manner to be described with respect to FIGS. 7 and 8. A cap spring 50 helps urge the parts into proper relationship when assembled, as best seen in FIG. 4.

FIG. 5 also illustrates that the needle seal 36 includes a pair of O-rings 51, which help orient it properly within the housing 37 to properly define the annular chamber 41.

The retaining flange 36 helps hold the seal cap in place when no vessel is in position, and the spring 50 helps urge the seal cap 47 downwardly in an appropriate orientation.

FIG. 5 also illustrates the switch 52 and its spacer 53. The spacer 53 only touches the switch when the spacer 53 touches the vessel 15, thus giving the switch 52 a contact or no-contact signal during operation of the instrument.

FIG. 4 also illustrates a transducer wire 48 for providing a signal communication path between the transducer and the appropriate processors. In all other aspects, the embodiment of FIG. 4A operates the same as the embodiment illustrated in FIG. 4.

Figure 4A:
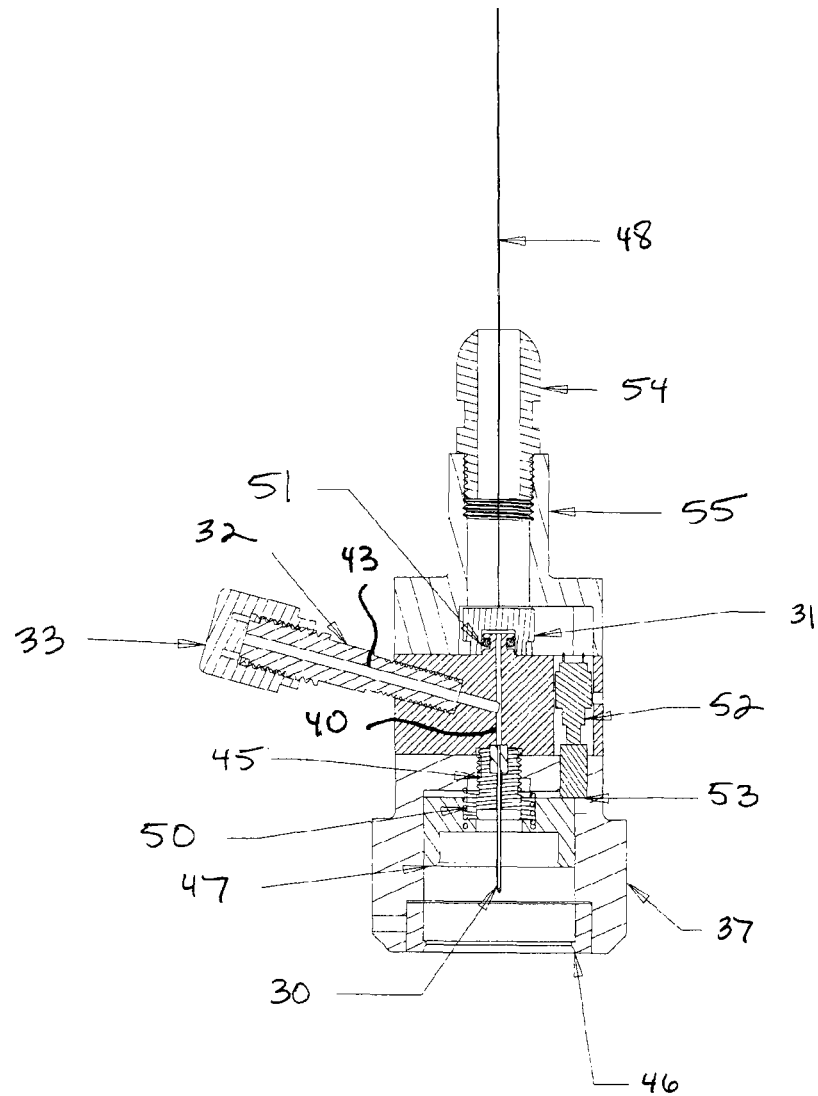
FIG. 4A is a cross sectional view of another embodiment of the pressure vessel assembly.

FIG. 4A illustrates a second embodiment of the pressure module assembly 14 according to the present invention. FIG. 4A includes a number of elements that are common to FIGS. 4, 5 and 6, and illustrates that in an alternative embodiment, the needle seal 36 can be formed of a larger single portion rather than as an insert in the housing 37. This reduces the size of the housing 37 and eliminates two of the three O-rings 51 that are illustrated in FIG. 4. In this embodiment, the port shaft 43 extends entirely through the needle seal 36 from the exterior of the pressure module assembly 14 to the coaxial shaft 40.

Figure 5A:
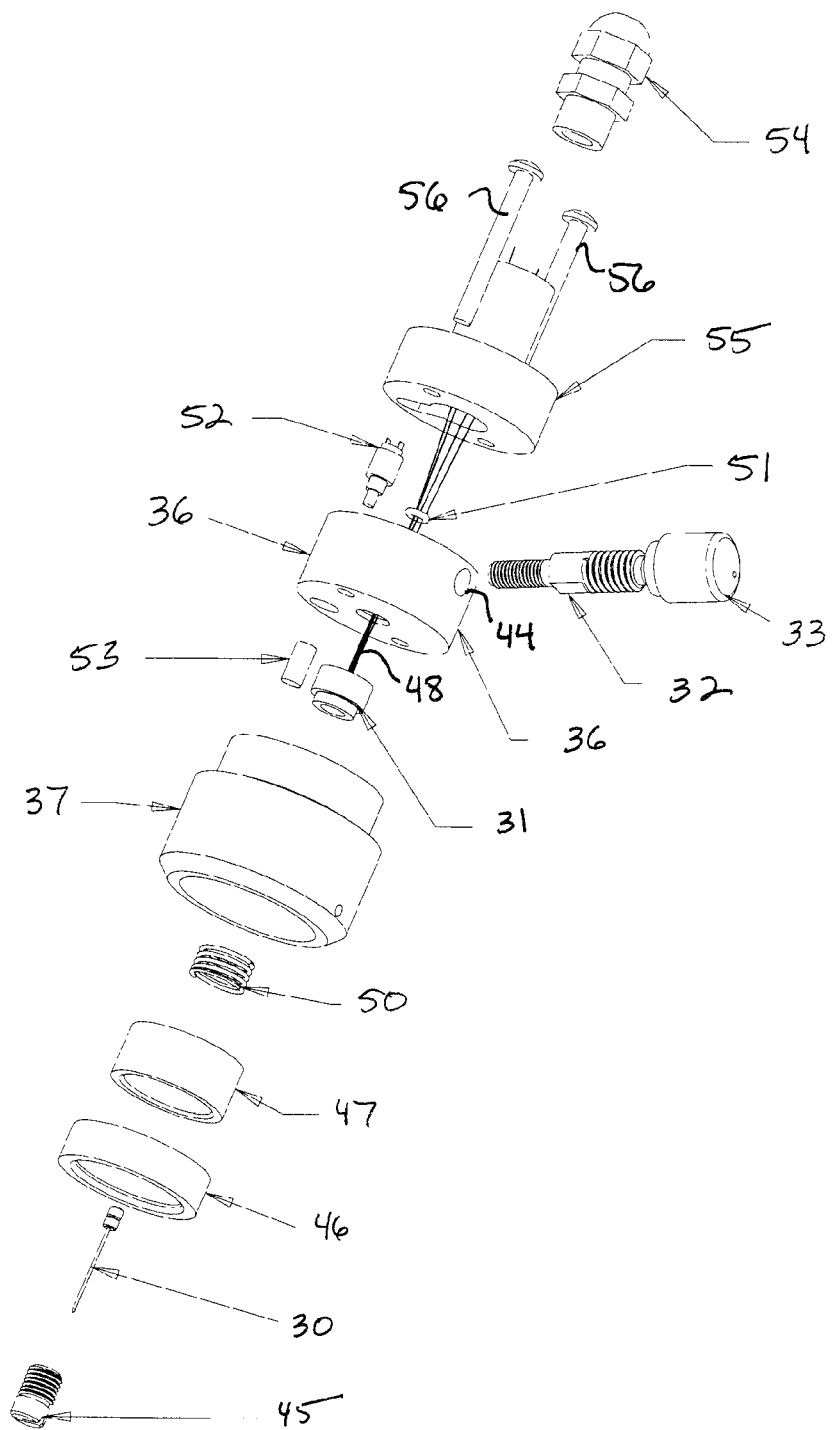
FIG. 5A is an exploded view of the second embodiment of the pressure module assembly according to the present invention.

In the same fashion, FIG. 5A illustrates the embodiment of FIG. 4A in exploded fashion. Given that all of the relevant parts have already been discussed, the operation of the embodiment of FIG. 5A will be understood in accordance with the previous descriptions herein.

It will be understood that electrical connection to the transducer 31 is made through the cable or wire 48 (FIGS. 4A and 5A) that enters the housing 37 through the strain relief 54 and the flange 55. A pair of screws 56 are used to assemble the flange 55 to the housing 37.

Figure 7:
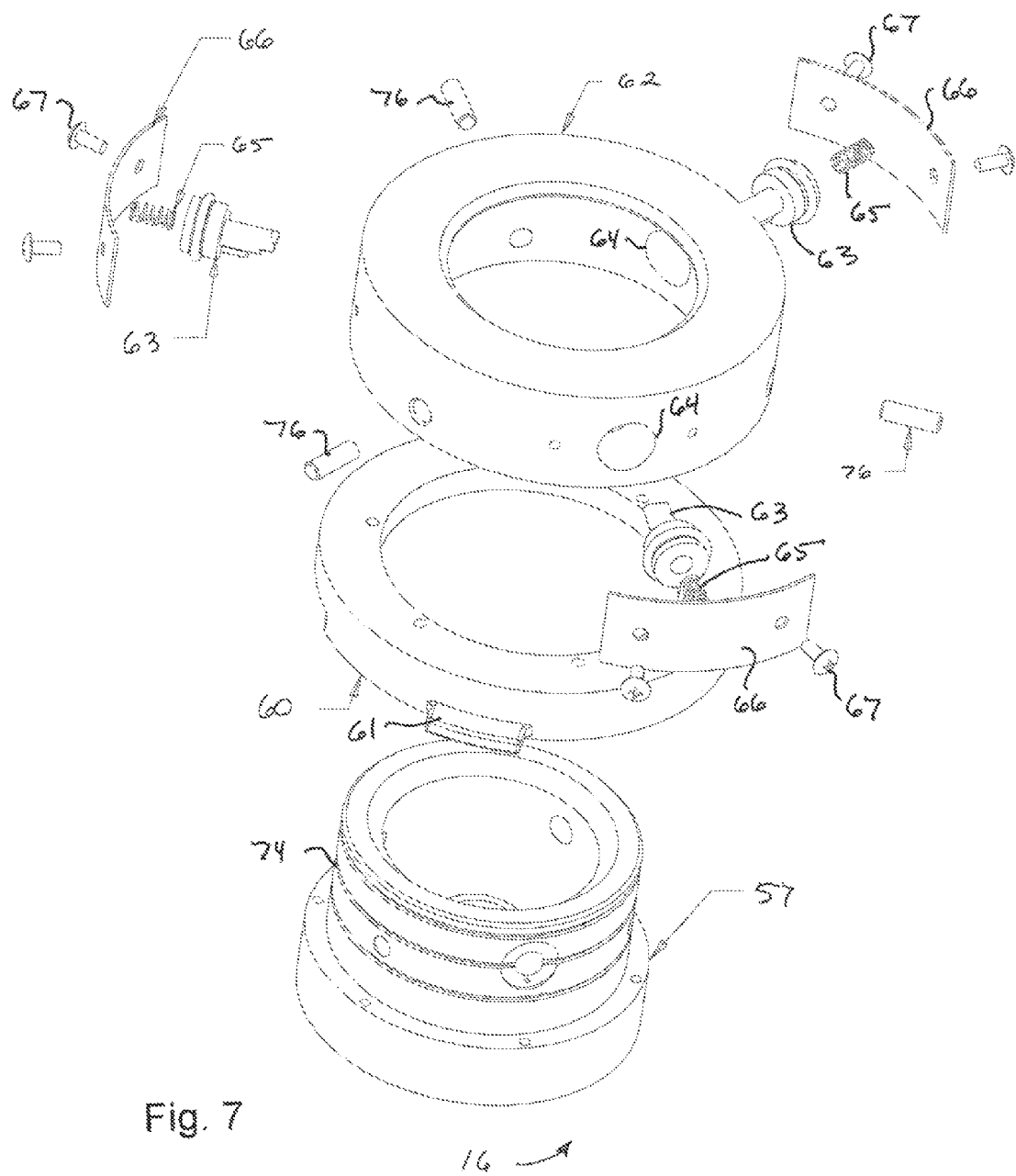
FIG. 7 is a partially exploded view of the attenuator assembly.

Aspects of the attenuator assembly 16 are also illustrated in FIG. 4, but are more easily understood using the orientation of FIGS. 7 and 8 which show the attenuator assembly in more detail. As familiar to those of ordinary skill in these arts, microwaves have a frequency range that is typically described as being between about 300 megahertz and 300 gigahertz, which corresponds to wavelengths of between about 1 millimeter and 1 meter. Electromagnetic radiation of these frequencies and wavelengths can interfere with other devices, or can even have potentially harmful medical effects such as interference with cardiac pacemakers, or can produce other undesired results. Accordingly, for these and other reasons, microwave instruments generally should include some form of attenuator; i.e., a means of limiting the application of microwaves to the desired reaction materials and vessels. In many circumstances, this is done by applying the microwaves entirely inside a closed cavity of the type that can be opened and closed in a manner as simple as a door. When made of metal (including metal screening of an appropriate size), the cavity serves as an effective barrier to microwave transmission.

For other types of reactions, however, open reaction systems, in which the cavity is open to some extent to the ambient surroundings, are more convenient. In such cases, an attenuator is used to prevent the unwanted transmission of microwaves to the ambient surroundings. An attenuator is generally formed of a structure, often cylindrical, that provides an opening into the cavity which is sufficient for the desired vessels, but which has a length and diameter, which prevents certain wavelengths from escaping. The use and sizing of such attenuators is well understood in the art and need not be discussed herein in detail other than to note that an attenuator in the form of a cylinder should have a diameter smaller than the propagated wavelength ($\lambda$) and a length that is at least one-fourth of the propagated wavelength.

Furthermore, because the advantages set forth in the copending and incorporated '846 application, include the advantage of being able to quickly and easily change reaction vessels into and out of the cavity, the present invention includes an appropriate attenuator assembly for preventing the escape of microwaves in such circumstances.

Thus, FIG. 7 shows a number of details of the attenuator assembly 16. The attenuator assembly 16 first includes the attenuator itself designated at 57. A lock ring 60 attaches to the attenuator 57 and includes a locking flange 61 for locking the attenuator into a microwave cavity that has an appropriate corresponding locking channel. A housing 62 holds the lock ring and the attenuator to one another and because the preferred attenuator is cylindrical in shape (but not necessarily so) the lock ring is 60 and the housing 62 are similarly annular in their geometry.

In addition to providing an attenuator against the undesired transmission of microwaves outside of the instrument, the attenuator assembly 16 provides a seat for receiving the pressure module assembly 14 for seating the vessel 15 in the cavity and positioning at least portions of the vessel 15 in the cavity. The lock ring 60 and locking flange 61 provide means for locking the attenuator in the cavity, and the attenuator itself further includes locking means described herein for locking the vessel assembly 15 and the pressure module assembly 14 in the seat formed by the cavity and the attenuator. Furthermore, in order to provide for rapid and convenient engagement and disengagement of the vessel and pressure assembly from the cavity, the attenuator assembly 16 includes a release mechanism for releasing the pressure module assembly and vessel assembly respectively from their seated position in the cavity.

Turning to the release mechanism in more detail, in the preferred and illustrated embodiment it includes a plurality of spring-loaded pistons 63 in the attenuator housing 62. The pistons 63 are positioned in respective cylinders 64 in the attenuator housing 62. The pistons 63 are urged circumferentially inwardly in the attenuator housing 62 by the combination of the springs 65 and the cover plates 66 which in turn are held to the attenuator housing 62 by the screws 67. In this manner, and absent any opposing force, the pistons 63 extend inwardly into the circular opening formed by the attenuator 57 and the attenuator housing 62. Each of the pistons 63 include a chamfered edge 70, however, so that when the pressure module assembly 14 is inserted into the attenuator assembly 16, the pistons retreat slightly under this engagement, and then re-engage the pressure module assembly by clamping over a ledge or shoulder 71 formed around the housing 37 of the pressure module assembly 14. In this manner, the pressure module assembly can be easily inserted and locked into place in the attenuator assembly 16 with the lower portions of the pistons 63 engaging the top portions of the shoulder 71.

In order to make sure that the pistons 63 are always oriented with the chamfered edge 70 facing up, each piston 63 also includes a small shaft 72 that in conjunction with an appropriate opening (FIG. 4) clocks the piston 63 in the proper orientation. An O-ring 73 also helps to seat the piston properly in the cylinder 64 while still providing for the biased movement urged by the springs 65.

In order to remove the pressure module assembly 14 from the attenuator assembly 16, the invention includes means for controllably urging the pistons 63 in a direction outwardly from the inner circumference of the attenuator housing 62. In FIG. 7, a first part of this mechanism is illustrated as the channel 74 in the attenuator 57.

The channel 74 works in conjunction with a port 75 for compressed air best illustrated in FIG. 2. When the attenuator assembly 16 is assembled, the compressed air port 75 is in fluid communication with the channel 74. Thus, when compressed air is fed into the compressed air port 75, it travels through the channel 74 and urges the pistons 63 outwardly against the bias of the springs 65. By so urging the pistons 63 backwardly, the use of the compressed air releases the pressure module assembly 14 from the attenuator assembly 16. Although compressed air is a convenient fluid to use in this manner (i.e., inert, inexpensive and generally convenient), it will be understood that the release mechanism is not limited to compressed air, and that other gases, and potentially some liquids, could serve this purpose.

As FIG. 7 illustrates, in preferred embodiments the pistons 63 are spaced equidistantly from one another around the circumference of the attenuator housing 62. FIG. 7 illustrates an embodiment with three pistons 63 set at angles of 120 degrees to one another. It will be understood, of course, that a single piston can serve as a locking device and that four or more pistons could be incorporated, all within the scope of the invention.

FIG. 7 also illustrates that the attenuator assembly can be assembled using the set screws 76, although again the use of set screws is one embodiment, rather than a limitation of the invention. Similarly, in other circumstances the number of individual parts illustrated in FIG. 7 could be reduced as desired by those of skill in the art all while operating within the scope of the invention.

FIG. 8 is a cross-sectional view of the unexploded attenuator assembly 16. FIG. 8 illustrates a number of the same features as set forth in FIG. 7, but in a different orientation that helps with an understanding of the operation of the illustrated embodiment. The air inlet port is again designated at 75 and the resulting channel 74 is in communication therewith. FIG. 8 also shows the pistons 63 in an engaged position, as well as a central opening 77 in the attenuator, portions of which are also illustrated in FIGS. 2 and 7. FIG. 8 illustrates portions of the attenuator 57 and the housing 62, as well as the lock flanges 61 that are a portion of the lock ring 60. As described with respect to the previous figures, the pistons 63 are urged circumferentially inwardly by the springs 65 which are held in place by the cover plates 66 and the screws 67.

Although the instrument has been described herein in terms of the helpful communication between and among the needle, the transducer and the pressure release valve, it will be understood that these elements can be favorably used independently from one another. For example, by incorporating a flexible septum that moves in response to the pressure inside the vessel, the transducer can be positioned in pressure communication with the septum, rather than the needle. This is particularly useful when the instrument is used to handle materials that would be corrosive to the transducer. In such cases the needle can be eliminated (if pressures are expected to remain low enough) or the flow path between the vessel and its surroundings can be isolated from the transducer.

In the same manner, where pressure release (or other fluid communication) is desired but specific pressure measurement is optional or unnecessary, the transducer can be eliminated entirely, while the instrument still takes advantage of the pressure release feature In another aspect, the invention is a method of carrying out microwave assisted chemical reactions. In this aspect, the method comprises adding reagents to a microwave transparent vessel, securing the vessel against pressure release with a seal, inserting a needle through a seal and into the pressure secured vessel to provide a fluid communication to the interior of the sealed vessel through the needle, communicating with a fluid between the interior of the sealed vessel and its ambient surroundings without otherwise breaching the seal and then irradiating the vessel and its contents with microwaves.

As used herein, the term "communicating with a fluid" refers to the passage of gases or liquids between the vessel and it surroundings, and can include pressure release from the vessel to the surroundings, or the addition of gases or liquids to the vessel from its surroundings, all without fatally or finally breaching the seal.

As described herein with respect to the instrument aspects of the invention, because the septum is resealable, the method can further comprise, removing the needle from the vessel following the step of irradiating the vessel and then inserting the needle into a second different vessel following the step of removing it from the initial vessel, or in a complimentary fashion, re-inserting the needle into the original vessel. In such cases, the method can further comprise irradiating the second vessel, or the vessel with the needle reinserted with microwaves following the step of inserting the needle.

In accordance with the device set forth in the incorporated '846 application, the method can further comprise monitoring the temperature of the vessel or its contents while irradiating the vessel and its contents with microwaves. Similarly, the invention provides the instrumentation for the method step of monitoring the pressure of the vessel; i.e. of its contents; while eradiating the vessel and its content with microwaves.

The method can further comprise moderating the application of microwaves to the vessel and its contents based on the monitored results of either the pressure or the temperature. The pressure monitoring can, of course, be accomplished using the instrument described herein. The temperature monitoring can be carried out in a suitable manner using infrared detection in a manner described in the incorporated '846 application. Infrared monitoring of the temperature of a sample being irradiated with microwaves is also described in commonly assigned U.S. Pat. No. 6,277,041. The monitored information can be forwarded to an appropriate processor, which in turn can control the application of microwaves using one or more of several moderating techniques. One moderating technique includes the use of a switching power supply as set forth in commonly assigned U.S. Pat. Nos. 6,084,226 and 6,288,379. Another method of moderating the application of microwaves in response to a monitored temperature or pressure is set forth in commonly assigned U.S. Pat. No. 5,796,080.

Furthermore, in a related aspect the invention is a method of carrying out microwave-assisted chemical reactions on a plurality of reagent and vessel combinations. In this aspect the method comprises adding reagents to a plurality of microwave-transparent vessels and securing each of the vessels against pressure release with a seal. Thereafter, the method includes inserting a needle through the seal of a first of the vessels and into the pressure-secured vessel to provide fluid communication to the interior of the sealed vessel through the needle, then irradiating the vessel and its contents with microwaves while monitoring the pressure inside and temperature of the vessel, then moderating the application of microwaves to the vessel in response to the monitored temperature and pressure and then removing the needle from the first vessel following the irradiation and moderating steps and without permanently or fatally breaching the seal of the vessel. In particular, this aspect of the method includes the step or steps of repeating the inserting, irradiating, monitoring, moderating and removing steps for the second and successive vessels of the plurality of vessels.

In particular circumstances, the method comprises adding a different set of reagents to at least the second vessel, or adding a different set of reagents to each vessel. In turn, the step of moderating the application of microwaves can include moderating the microwave power, moderating the duty cycle, or physically moderating the transmission of microwaves between a microwave source and the vessel.

In this aspect the step of monitoring the temperature can comprise optically monitoring the temperature without invading the vessel, and the step of monitoring the pressure can comprise monitoring the pressure with a transducer positioned in the sealed flow path that communicates with the interior of the vessel through the needle, as described herein with respect to the structural aspects of the invention.

In the drawings and specification there has been set forth preferred embodiments of the invention, and although specific terms have been employed, they are used in a generic and descriptive sense only and not for purposes of limitation, the scope of the invention being defined in the claims.

The invention claimed is:

1. An attenuator assembly for a microwave instrument comprising:
   a microwave attenuator;
   a lock ring on said attenuator for locking said attenuator to a microwave cavity;
   an annular housing engageable with said lock ring;
   a plurality of spring-loaded pistons in said housing that are urged inwardly from the inner circumference of said housing towards its center; and
   means for controllably urging said pistons in a direction outwardly from the inner perimeter of said housing.

2. An attenuator assembly according to claim 1 wherein said means for controllably urging said pistons in an outwardly direction comprises:
   a channel between said attenuator and said housing and in communication with said pistons; and
   a source of compressed air in communication with said channel for urging said pistons outwardly when compressed air is supplied to said channel.

3. An attenuator assembly according to claim 1 wherein said microwave attenuator is an annular cylinder.

4. An attenuator assembly according to claim 1 wherein said locking ring includes a locking flange for attaching said attenuator assembly to a microwave cavity.

5. An attenuator according to claim 1 wherein said means for urging said pistons outwardly comprises:
   a circumferential channel between said attenuator and said housing that is in communication with said pistons; and
   a port in said housing and in fluid communication with said channel so that a fluid fed into said port will exert pressure against said pitons to move them circumferentially outwardly.

* * * * *